March 24, 1925.
A. CLEMENT
1,530,813
FEEDING DEVICE FOR SELF BINDERS
Filed Jan. 20, 1922
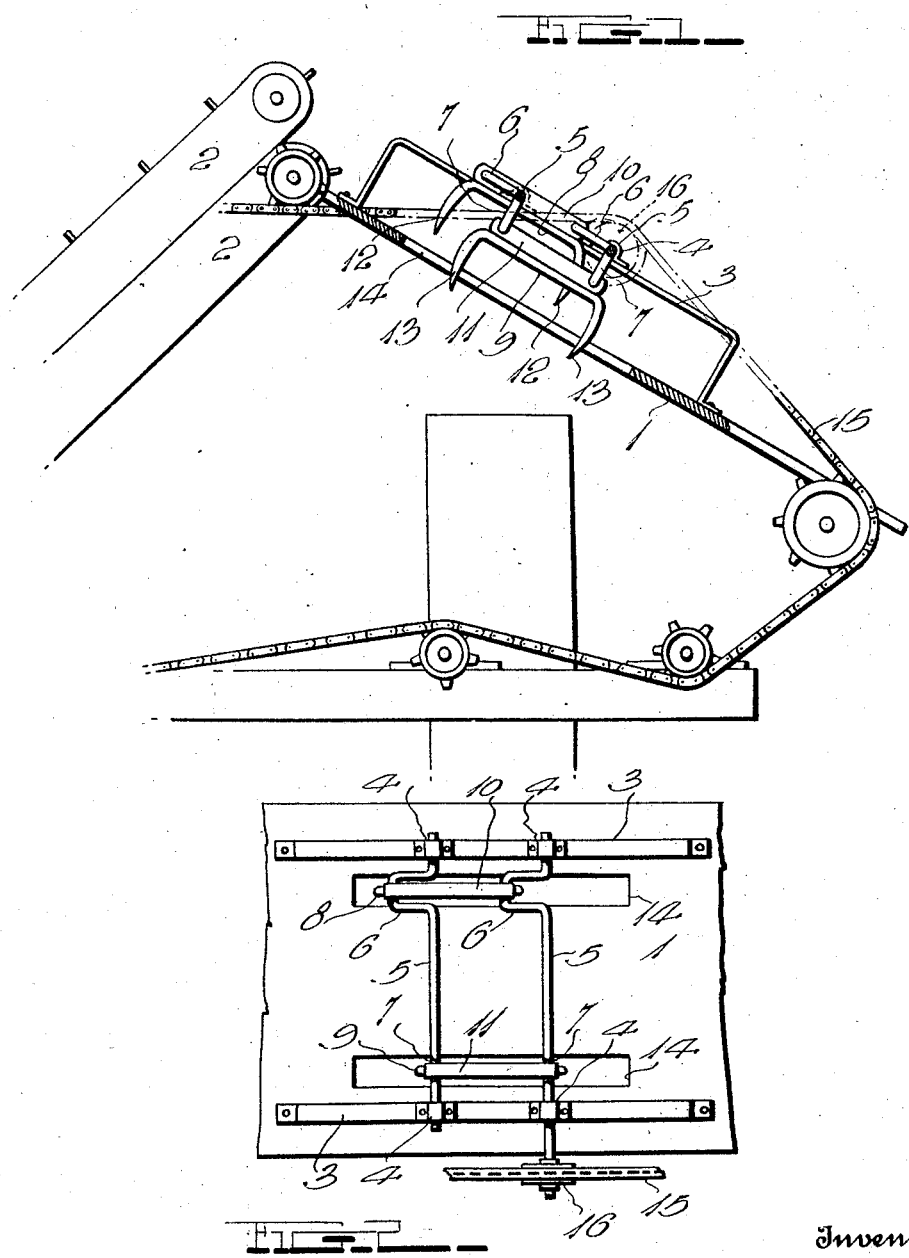
Inventor
Andre Clement
Witness
H. Woodard
By H. B. Wilson & Co.
Attorneys Patented Mar. 24, 1925.

1,530,813

UNITED STATES PATENT OFFICE.

ANDRE CLEMENT, OF RED LAKE FALLS, MINNESOTA, ASSIGNOR OF ONE-FOURTH TO PETER F. POULIOT AND ONE-FOURTH TO XAVIER CLEMENT, BOTH OF RED LAKE FALLS, MINNESOTA.

FEEDING DEVICE FOR SELF-BINDERS.

Application filed January 20, 1922. Serial No. 530,719.

*To all whom it may concern:*

Be it known that I, ANDRE CLEMENT, a citizen of the United States, residing at Red Lake Falls, Red Lake County, Minnesota, have invented new and useful Feeding Devices for Self-Binders, of which the following is a specification.

This invention relates to an improved feeding device or rake for use in connection with a binding machine of a conventional construction, and one object of the invention is to provide a rake which is so constructed that it may be mounted over the usual deck leading from the conveyor rollers to the binding mechanism and serve to compress the grain stalks upon the deck and move them toward the binding mechanism in a compact mass.

Another object of the invention is to provide a rake so constructed that the forks thereof may be carried by crank shafts and moved in an operative direction in their proper order, each crank shaft being provided with crank extensions extending at the proper angle with respect to each other to control movement thereof.

Another object of the invention is to provide a rake construction which will be of a very simple construction and not liable to readily get out of order by becoming broken or clogged with straw.

This invention is illustrated in the accompanying drawing, wherein:

Figure 1 is a view principally in side elevation and showing a fragment of a conventional structure of binding machine with the improved rake connected with the deck and shown in longitudinal section.

Figure 2 is a fragmentary view of the deck showing the rake in top plan.

This improved rake device is to be used in connection with a binding machine of a conventional construction and will be mounted upon the sheet iron deck 1 for engaging the grain stalks which pass from the conveyors 2 and compressing this straw and moving the same downwardly upon the deck 1 toward the usual binding mechanism. This rake structure is provided with supporting bars 3 which extend longitudinally of the deck 1 and will be connected with the deck in any desired manner. Bearings 4 are carried by these supporting bars 3 and rotatably receive the end portions of the crank shafts 5 which extend transversely of the deck 1 and are provided with crank extensions 6 and 7. The crank extensions 6 extend at right angles to the crank extensions 7 and it will thus be seen that the rake carried by one set of crank extensions will be moving in an operative direction when the rake carried by the second set of crank extensions is inoperative. It will of course be understood that additional crank extensions may be provided if so desired and that these additional crank extensions would be extended from the crank shafts at the proper angles. The rakes 8 and 9 are in the form of bars secured to the under surfaces of the links 10 and 11 which are loosely mounted upon the crank extensions 6 and 7. These bars 9 have their end portions bent downwardly to provide prongs 12 and 13 which are of such length that as the crank shafts rotate, the prongs may pass downwardly into and longitudinally through the slots 14 formed in the deck 1.

When this device is in use, it will be applied to the deck 1 of the binder with the forks positioned in operative relation to the slots 14 which will be formed therein and a suitable sprocket chain 15 will be placed in engagement with the sprocket wheel 16 mounted upon the extended end portion of one of the crank shafts 5. The binder can now be operated in the usual manner and as it moves across a field, the grain stalks will be delivered by the endless conveyors 2 to the upper end of the deck 1. These grain stalks will tend to slide downwardly upon the deck and as the crank shafts 5 rotate, the prongs of the forks will engage the stalks and move them downwardly and compress them during the time they are moving downwardly. The stalks will thus be formed into a compact mass and will be delivered to the usual binding mechanism in such a condition that very good bundles may be formed. It will thus be seen that there has been provided an attachment which may be used in connection with a conventional structure of binder and will serve to downwardly feed and compress the grain stalks so that they will be delivered to the bundle-forming mechanism in very good condition.

I claim:

1. The combination with an inclined binder deck having a pair of longitudinally extending slots near the edges of the grain path; of a pair of spaced driven crank shafts extending transversely of the deck and spaced equidistantly above the latter over the upper and lower ends of said slots, links parallel with said deck and connected with the cranks of said crank shafts to be longitudinally and vertically moved thereby, and rigid prongs projecting downwardly from said links for movement toward and from the deck, said prongs being movable first toward the deck into the upper ends of said slots and being then movable downwardly within said slots toward the lower ends of the deck.

2. The combination with an inclined binder deck having a pair of longitudinal slots near the ends of the grain path; of a pair of inclined bars parallel with and spaced upwardly from said deck, adjacent the edges of said grain path, said bars having downwardly projecting ends secured to said deck, a pair of spaced bearings secured to each of said bars, said bearings being alined transversely of the deck, a pair of parallel shafts mounted in said bearings over the upper and lower ends of the aforesaid slots, each of said shafts having a pair of cranks disposed over said slots, links parallel with the deck and connected at their ends with said cranks to be moved toward and from the deck and longitudinally of the latter thereby, rigid prongs projecting downwardly from the ends of said links, and adapted for movement thereby toward and from the deck as well as longitudinally of the latter, said prongs being first movable toward the deck to positions within the upper ends of said slots and being then movable longitudinally within the slots toward the lower end of the deck, and means for driving the aforesaid shafts.

ANDRE CLEMENT.

Witnesses:
FRANK GRENIER,
XAVIER CLEMENT.